(No Model.)
J. DAVIS.
FILTER.
No. 572,196.  Patented Dec. 1, 1896.
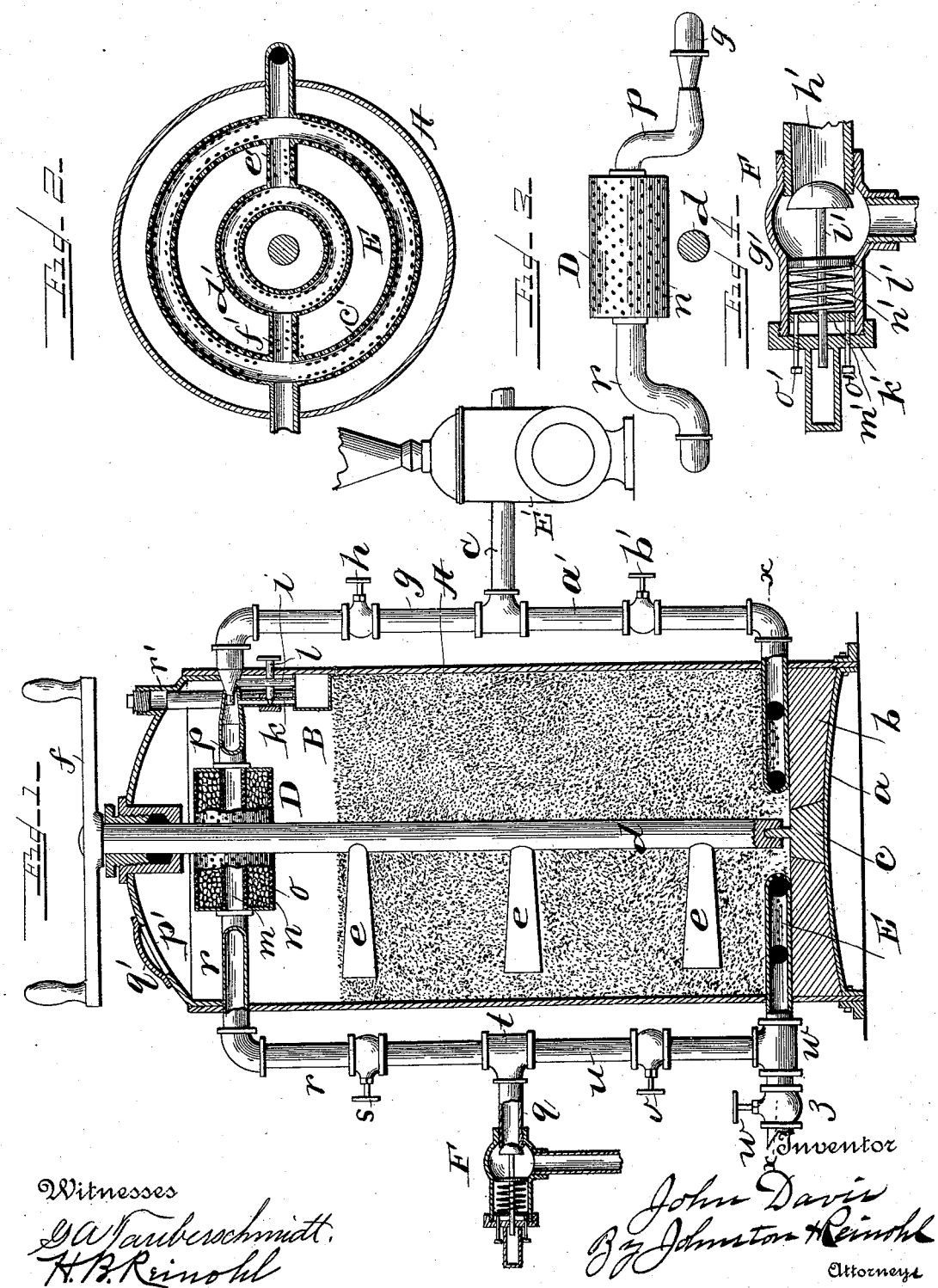
Witnesses
Inventor
John Davis
By Johnston & Reinohl
Attorneys

UNITED STATES PATENT OFFICE.

JOHN DAVIS, OF ALLEGHENY, PENNSYLVANIA.

FILTER.

SPECIFICATION forming part of Letters Patent No. 572,196, dated December 1, 1896.

Application filed April 14, 1892. Serial No. 429,127. (No model.)

*To all whom it may concern:*

Be it known that I, JOHN DAVIS, a citizen of the United States, residing at Allegheny, in the county of Allegheny and State of Pennsylvania, have invented certain new and useful Improvements in Filters; and I do hereby declare the following to be a full, clear, and exact description of the invention, such as will enable others skilled in the art to which it appertains to make and use the same.

My present invention relates to filters, and has for its object certain improvements in construction, which will be fully disclosed in the following specification and claim.

In the accompanying drawings, which form part of this specification, Figure 1 represents a vertical section; Fig. 2, a plan on line $xx$, Fig. 1; Fig. 3, a detail plan of the strainer; and Fig. 4, a vertical section of the back-pressure valve, on an enlarged scale.

Reference being had to the drawings and the letters thereon, A indicates the body of the filter, which is filled with suitable filtering material to about the height indicated in Fig. 1, preference being given to clear white sand. Upon the metallic bottom $a$ is a bed of cement $b$, or other suitable material impervious to water, and a step $c$, upon which the shaft $d$ of the agitator rests. The agitator consists of the shaft $d$, having blades $e$ secured thereto, and a lever $f$ for raising the filter-bed and agitating the same for the purpose of cleansing it from impurities arrested in the operation of filtering water or other liquid. Within the filter is a chamber B to receive chemicals, such as alum or other well-known material, to coagulate the impurities contained in water.

C indicates the supply-pipe, having an upward branch $g$, provided with a valve $h$ and communicating with the chamber B by means of a pipe $i$ for supplying water to the chemical and by a pipe $k$ for conducting the chemical into the water flowing into the filter, the supply of the chemical in solution being controlled by the needle-valve $l$ and the water discharged through the strainer or pebble valve D above the filter-bed.

The strainer or pebble valve consists of two perforated concentric cylinders $m$ $n$ and an annular chamber $o$, having imperforate heads or ends and filled with pebbles or globular bodies and communicating with the branch $g$ of the supply-pipe by a section $p$ and with the waste-pipe $q$ by a section $r$, having a valve $s$. From the T $t$ extends a pipe $u$, which is provided with a valve $v$ and communicates with the discharge-pipe $w$, having a valve $z$. To the supply-pipe C is also connected a downward branch $a'$, provided with a valve $b'$ and connected to a pipe E, which rests upon the cement bed $b$. This pipe is preferably composed of two sections $c'$ $d'$, connected by branches $e'$ $f'$, and is perforated on its sides, leaving imperforate portions on the top and bottom to discharge water for cleansing the filter-bed in lateral streams, which raise the filter-bed from off the cement bed $b$ and cleanse every particle thereof.

For filtering water the valves $b'$, $v$, and $s$ are closed and the valves $h$ and $z$ opened, when the water will be discharged through the pebble-valve D above and percolate through the filter-bed into the perforated pipe E, from which it is discharged through pipe $w$ and valve $z$.

To cleanse the filter-bed, the valves $h$, $z$, and $v$ are closed, the valves $b'$ and $s$ are opened, and the water discharged laterally through the perforations in pipe E, while the filter-bed is agitated mechanically by the rotation of the agitator and the impurities contained in the filter-bed pass through the strainer or pebble valve D into the branch $r$ and are discharged through the waste-pipe $q$ until the water runs clear, when valves $h$ and $v$ are opened and $b'$ and $s$ closed. Valve $v$ is left open long enough to drain pipe E, when it is closed and valve $z$ opened for the discharge of filtered water.

In the operation of cleansing the filter-bed the strainer or pebble valve D performs a very important function in that it arrests and prevents the escape of loose sand from the filter-bed and takes the place of the diaphragm heretofore placed across the filter above the bed for the same purpose, while it does not interfere with the charging or removing of the filter-bed.

When the filter is used to supply clear water to steam-boilers, the pump E' is connected to the supply-pipe C and the pipe $w$ communicates with the boiler. (Not shown.) When so used, a back-pressure valve F is attached to the waste-pipe to prevent racing of the pump while the filter-bed is being cleansed. This valve consists of a body $g'$, a valve $h'$, having a stem $i'$, which extends through the cover or cap $k'$ and has secured thereto a disk $l'$, between which and a movable disk $m'$ is a spring $n'$, the tension of which is regulated to equal the pressure of the steam in the boiler by screws $o'$, which extend through the cap $k'$ and bear upon the movable disk $m'$. Thus if the pressure in the boiler is forty pounds and against which the pump is operating to supply water to the boiler the valve F must be put under the same or greater pressure by the tension of spring $n'$ when the supply of water to the boiler is cut off and the filter-bed is being cleansed or the absence of boiler-pressure will cause the pump to race and destroy itself.

The means shown for effecting the supply of water to the chemical-chamber under increased pressure to agitate the chemical and the discharge of the water impregnated with the chemical into the incoming water from the supply-pipe under reduced pressure are fully set forth and claimed in an accompanying application, Serial No. 429,126.

The sand for the filter-bed is supplied and removed through a hand-hole $p'$, having a cover $q'$, and the chemicals are supplied to chamber B through pipe $r'$.

Having thus fully described my invention, what I claim is—

The combination of a filter provided with a supply-pipe and a pump connected thereto, a discharge-pipe to communicate with a steam-boiler, a waste-pipe and a back-pressure valve provided with means to weight the valve equal to the pressure of the boiler.

In testimony whereof I affix my signature in presence of two witnesses.

JOHN DAVIS.

Witnesses:
ADDISON Z. BYERS,
EDW. A. HESS.